J. W. BARNES.
CLUTCH MECHANISM FOR THE DRIVING GEAR OF LATHES, BORING MACHINES, MILLING MACHINES, AND THE LIKE.
APPLICATION FILED AUG. 3, 1915.

1,175,500.

Patented Mar. 14, 1916.
3 SHEETS—SHEET 1.

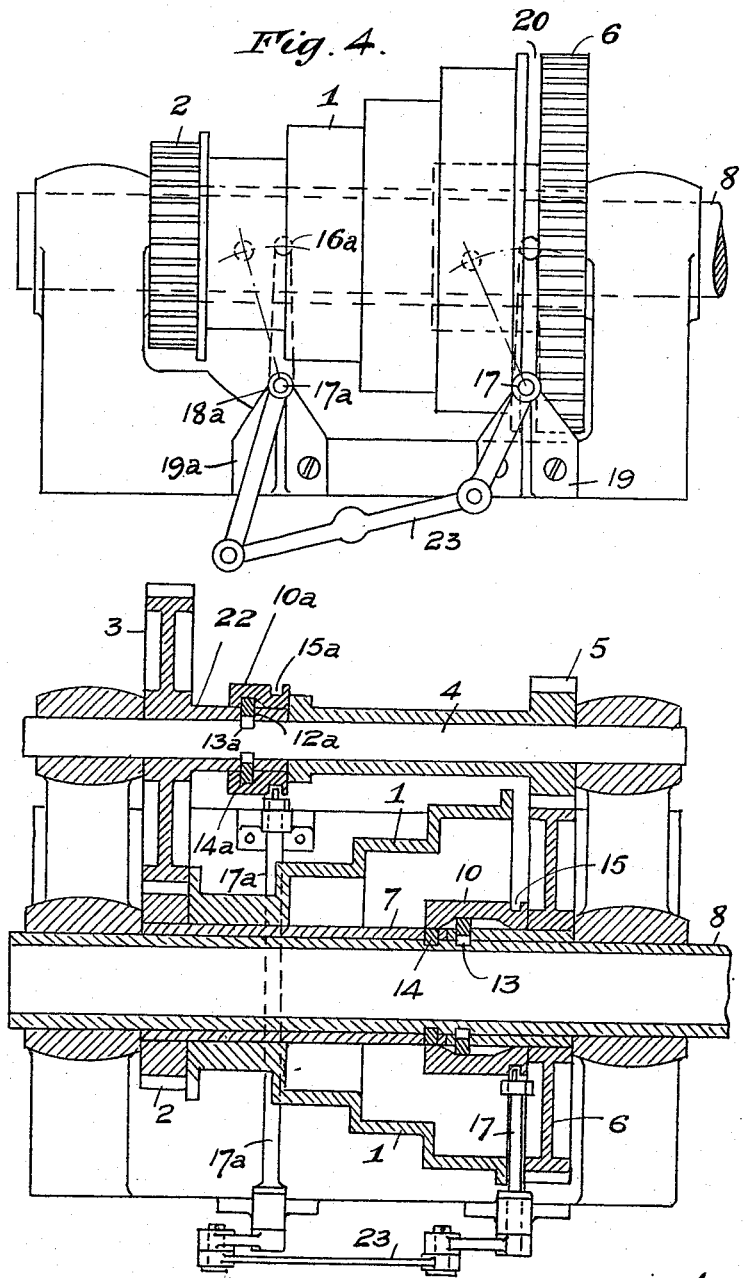

UNITED STATES PATENT OFFICE.

JOHN WILLIAM BARNES, OF ROCK FERRY, ENGLAND.

CLUTCH MECHANISM FOR THE DRIVING-GEAR OF LATHES, BORING-MACHINES, MILLING-MACHINES, AND THE LIKE.

1,175,500.  Specification of Letters Patent.  Patented Mar. 14, 1916.

Application filed August 3, 1915. Serial No. 43,468.

*To all whom it may concern:*

Be it known that I, JOHN WILLIAM BARNES, a subject of the King of Great Britain, and a resident of Rock Ferry, Cheshire, England, have invented certain new and useful Improvements in Clutch Mechanisms for the Driving-Gear of Lathes, Boring-Machines, Milling-Machines, and the like, of which the following is a specification.

This invention relates to an improved clutch mechanism for use in the driving gear of turning tools such as lathes, boring and milling machines, or the like, whereby the speed of the cutting drives of such tools or machinery may be readily changed without the disadvantages attendant on the present arrangements.

According to this invention the driven element, such as the spindle in the case of a lathe, is provided with two or more sets of keyways or transverse recesses forming tangential flats in the cylindrical surface thereof. These flats are arranged in pairs, the two flats of each pair being diametrically disposed. Radially movable keys or pads of segmental section and engaging perforations in tubular bosses or the like integral with the driving element or elements of the gear, such as the stepped belt pulley of the lathe headstock and the large gear on the spindle, are adapted to be moved into engagement with the flats in the spindle or driven element or allowed to become freed therefrom by the operation of an axially movable sleeve or sleeves, the ends of such sleeve or sleeves fitting around the tubular bosses of the driving elements and having cam faces for engaging the keys or pads formed at each end of the central annular pocket. Means are provided, such as a spindle fitted with a crank or eccentric and coupled to the sliding sleeve, whereby on rotating the spindle the sleeve is moved and the keys operated to couple or uncouple the driving elements and vary the speed of the driven spindle or the like. In the case of a triple geared lathe headstock, a similar clutch mechanism may be provided for throwing in or out of engagement, as desired, a series of gears on the back gear shaft.

The invention is illustrated in the accompanying drawings, in which—

Figure 1:
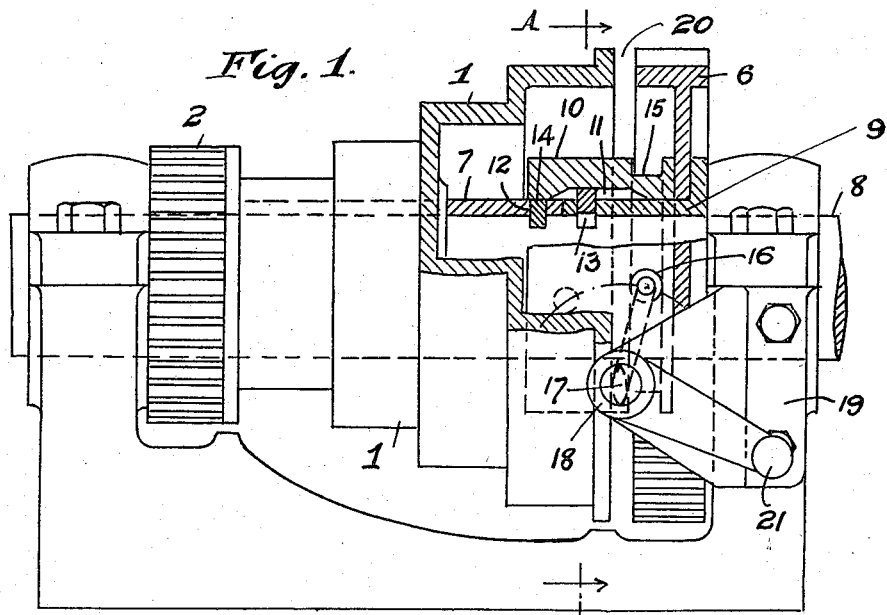
Figure 2:
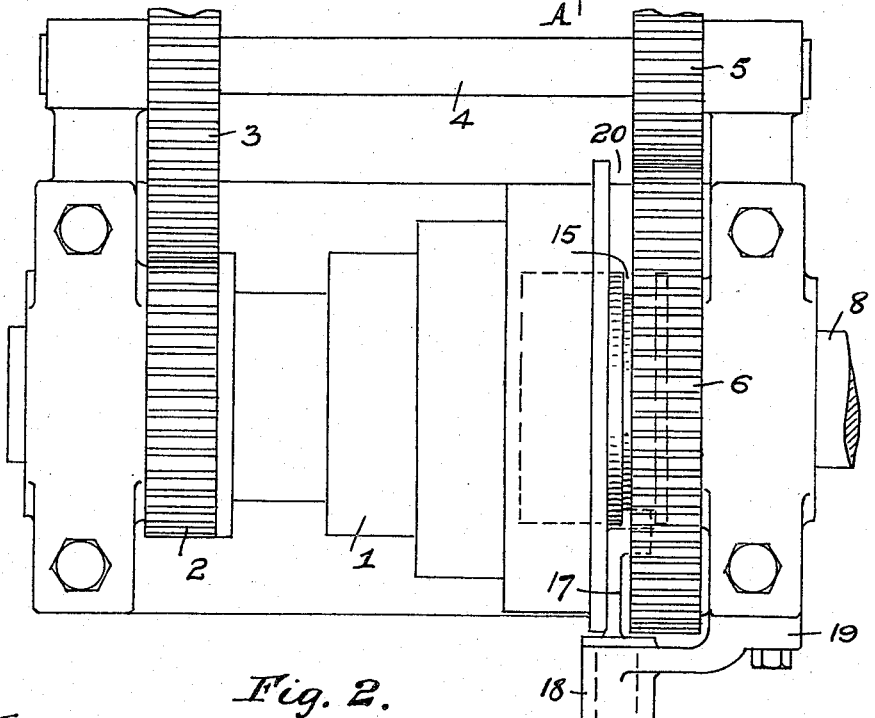
Figure 3:
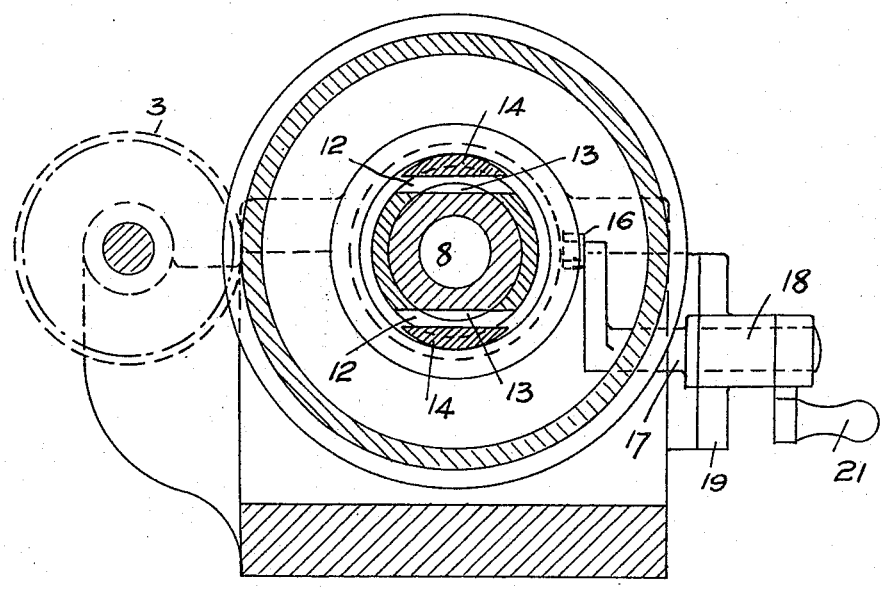

Figure 1 is an elevation, partly in section, of a lathe headstock, Fig. 2 being a fragmentary plan, and Fig. 3, a cross section, of Fig. 1 on the line A—A. Fig. 4 is an elevation, and Fig. 5, a plan in section, of a lathe headstock showing a modified form of the invention in which a clutching mechanism is also provided for the back gear shaft.

In carrying out the invention as applied to the back gear or analogous gear train of a lathe, Figs. 1, 2, and 3, the usual hollow stepped belt pulley 1 or primary driving element of the fast headstock is formed integral at its smaller end with the usual smaller toothed pinion 2 meshing with the larger gear wheel 3 on the back gear shaft 4, such back gear shaft also carrying the smaller pinion 5 meshing with the large gear wheel 6 or terminal driving element mounted concentrically with the stepped belt pulley 1 and adjacent thereto, as in the usual arrangement. The small pinion 2 concentric with the stepped pulley is formed integral, or secured rotatively, therewith, and is either integral with, or keyed rotatively to, a tubular element or boss 7 loose rotatively on the lathe spindle 8. The gear wheel 6 at the larger end of the stepped pulley and concentric therewith is also formed integral with, or keyed rotatively to, a tubular element 9 or boss also rotatively loose on the lathe spindle, both tubular elements where they abut being inclosed by a slidable sleeve 10 having a central annular pocket 11. Each tubular element of the stepped pulley 1 and the large gear wheel, 6 is provided near its abutting end with oppositely disposed perforations 12 corresponding axially with oppositely disposed flats 13 formed in the spindle, and in the perforations 12 are fitted radially movable segmental pads 14 flat on their inner sides which engage the transverse flats 13, or keyways, in the lathe spindle, but circular or curved on their outer faces. The bore of each end of the sliding sleeve 10 is reduced to fit closely the outer diameters of the tubular elements or bosses 7, 9, and by sliding the sleeve axially in one or other direction until the reduced bore of one or other end of the sleeve forces one or other set of keys into engagement with the corresponding flats in the spindle 8, the latter may be rotatably coupled either direct to the stepped pulley 1 or to the large spur wheel 6 driven by the back gear, the other set of pads being permitted to disengage themselves from their recesses 13 by reason of the annular pocket 11 in the sleeve coinciding with those pads. The pads disengage themselves by an outward radial movement due to centrifugal action. For a direct drive, therefore, the sleeve 10 is moved until the pads in the tubular element of the stepped pulley 1 are coupled to the lathe spindle 8 as in Fig. 1, while by sliding the sleeve in the opposite direction the other pads are engaged and couple the larger gear wheel 6 to the lathe spindle, the drive then being from the stepped belt pulley 1, now loose on the spindle, through the back gears 3, 5 to the large spur wheel 6 on the lathe spindle. The axial movement of the sleeve 10 may be effected by providing it with a groove or race 15 in its exterior engaged by the rollered end 16 of a cranked spindle 17 suitably journaled at 18 in a bracket 19 and passing through a space 20 left between the large gear wheel 6 on the lathe spindle and the large end of the stepped pulley 1, a handle 21 being mounted at the exterior end of this spindle for rotating it to operate the sleeve. The usual hollow interior of the stepped pulley is taken advantage of to house the sleeve 10 controlling the pads or keys 14, so that the exterior appearance of the lathe headstock is not altered.

In the modification shown in Figs. 4 and 5, the large spur wheel 3 instead of being fixed on the back gear shaft 4 is provided with a tubular boss 22 and is loosely mounted on the shaft 4 in such manner that it may be clutched thereto. For this purpose the boss 22 is provided with perforations 12ª as previously described, and flat recesses 13ª are formed in the spindle 4 which are adapted to be engaged by pads 14ª, the engagement and disengagement of the pads being controlled by the axial movement of a sleeve 10ª provided with an inner recess 11. In Fig. 5 the pads are shown disengaged and the large wheel 3 loose on the shaft 4. This freeing position of the sleeve 10ª is arranged to take place when the main sleeve 10 has been moved to the position shown, coupling the belt pulley 1 to the lathe spindle 10. Similarly, when the sleeve 10ª moves to the left to couple the gear wheel 3 to the back gear shaft 4, the sleeve 10 frees the belt pulley 1 and couples the gear wheels 6 to the lathe spindle 8. The interconnected movement of the back sleeve 10ª and the main sleeve 10 is effected by means of a second crank spindle 17ª, journaled at 18ª in a bracket 19ª, the end 16ª engaging a recess 15ª in the sleeve 10ª and both spindles 17ª and 17 being connected by a link 22 so that they are oscillated simultaneously.

In order to provide for a triple or multiple gear lathe, the back gear shaft 4 is fitted with two gear wheels 3 and 5 of different pitch diameters permanently engaging with corresponding gear wheels 2 and 6, for the requisite change speeds, concentrically mounted on and rotating with the lathe spindle. The gear wheels 3 and 6 are mounted loosely on their shafts, and are provided with tubular elements or bosses or the like fitted with sets of pads or keys controlled by a sliding sleeve, in the way previously described, for keying one or other of these wheels to its shaft according to the particular speed required, the other gear wheel rotating idly.

I claim:—

1. In a clutch mechanism for the driving gear of rotary tools, in combination; a driven spindle having two sets of recesses; a primary driving element having a tubular boss loose on the driven spindle, said bars having perforations registering with one set of recesses; a terminal driving element having a tubular boss loose on the driven spindle and having perforations registering with the other set of recesses; radially movable pads in the perforations; a gear train permanently coupling the primary and terminal driving elements; and an axially movable sleeve adapted alternatively to couple the primary or terminal driving element to the spindle.

2. In a clutch mechanism for the driving gear of rotary tools, in combination; a driven spindle having two sets of recesses; a stepped belt pulley having a tubular boss loose on the spindle; said pulley boss having perforations registering with one set of recesses; a gear wheel having a tubular boss loose on the driven spindle, said gear wheel boss having perforations registering with the other set of recesses; radially movable pads in the perforations; a gear train permanently coupling the belt pulley and the gear wheel; and an axially movable sleeve adapted alternatively to couple the belt pulley or the gear wheel to the spindle.

3. In a clutch mechanism for the driving gear of rotary tools, in combination; a driven spindle having two sets of recesses therein; a primary driving element having a tubular boss loose on the driven spindle, said boss having perforations registering with one set of recesses; a terminal driving element having a tubular boss loose on the driven spindle and having perforations registering with the other set of recesses; radially movable pads in the perforations; a gear train coupling the primary and terminal driving elements; a clutch for coupling or uncoupling the gear train connection; and an axially movable sleeve adapted alternatively to couple the primary or terminal driving element to the spindle.

4. In a clutch mechanism for the driving gear of rotary tools, in combination; a driven spindle having two sets of recesses therein; a stepped belt pulley having a tubular boss loose on the spindle, said boss having perforations registering with one set of recesses; a gear wheel having a tubular boss loose on the driven spindle; the gear wheel boss having perforations registering with the other set of recesses; radially movable pads in the perforations; a gear train permanently coupling the belt pulley and the gear wheel; an axially movable sleeve adapted alternatively to couple the belt pulley or the gear wheel to the spindle; and a cranked spindle passing between the belt pulley and the gear wheel for actuating the sleeve.

5. In a clutch mechanism for the driving gear of rotary tools, in combination; a driven spindle having two sets of recesses therein; a primary driving element having a tubular boss loose on the driven spindle, said boss having perforations registering with one set of recesses; a terminal driving element having a tubular boss loose on the driven spindle, said boss having perforations registering with the other set of recesses; radially movable pads in the perforations; a gear train coupling the primary and terminal driving elements; a clutch for coupling or uncoupling the gear train connection; an axially movable sleeve adapted alternatively to couple the primary or terminal driving element to the spindle; and means for interconnecting the axially movable sleeve and the gear train clutch.

In testimony whereof I affix my signature in presence of two witnesses.

JOHN WILLIAM BARNES.

Witnesses:
A. J. DAVIES,
M. E. MITCHELL.

Copies of this patent may be obtained for five cents each, by addressing the "Commissioner of Patents, Washington, D. C."